US009096056B2

(12) United States Patent
Zhou et al.

(10) Patent No.: US 9,096,056 B2
(45) Date of Patent: Aug. 4, 2015

(54) APPARATUS AND METHOD FOR MEASURING DROP VOLUME

(75) Inventors: Jing Zhou, Webster, NY (US); Fusheng Xu, Webster, NY (US); James Beachner, Ontario, NY (US)

(73) Assignee: Xerox Corporation, Norwalk, CT (US)

( * ) Notice: Subject to any disclaimer, the term of this patent is extended or adjusted under 35 U.S.C. 154(b) by 301 days.

(21) Appl. No.: 13/111,193

(22) Filed: May 19, 2011

(65) Prior Publication Data

US 2012/0296581 A1 Nov. 22, 2012

(51) Int. Cl.
*G01C 15/00* (2006.01)
*B41J 2/045* (2006.01)

(52) U.S. Cl.
CPC .............. *B41J 2/0458* (2013.01); *B41J 2/0456* (2013.01); *B41J 2/04576* (2013.01)

(58) Field of Classification Search
CPC .... G06F 3/011; B41J 2/04561; B41J 2/04535
USPC .............................................................. 702/55
See application file for complete search history.

(56) References Cited

U.S. PATENT DOCUMENTS

| | | | | |
|---|---|---|---|---|
| 5,387,976 | A * | 2/1995 | Lesniak | 356/627 |
| 5,526,027 | A * | 6/1996 | Wade et al. | 347/14 |
| 5,621,447 | A * | 4/1997 | Takizawa et al. | 347/88 |
| 5,689,291 | A * | 11/1997 | Tence et al. | 347/10 |
| 5,818,475 | A * | 10/1998 | Miyazaki et al. | 347/19 |
| 5,914,739 | A * | 6/1999 | Zhang | 347/71 |
| 6,109,723 | A * | 8/2000 | Castle et al. | 347/19 |
| 6,264,298 | B1 * | 7/2001 | Mantell | 347/15 |
| 6,352,330 | B1 * | 3/2002 | Lubinsky et al. | 347/15 |
| 6,428,134 | B1 * | 8/2002 | Clark et al. | 347/10 |
| 6,513,901 | B1 * | 2/2003 | Walker | 347/19 |
| 6,517,182 | B1 * | 2/2003 | Scardovi | 347/19 |
| 6,655,775 | B1 * | 12/2003 | Raman et al. | 347/19 |
| 6,698,862 | B1 * | 3/2004 | Choi et al. | 347/17 |
| 6,985,254 | B2 * | 1/2006 | Allen et al. | 358/1.9 |
| 7,121,642 | B2 * | 10/2006 | Stoessel et al. | 347/19 |
| 7,585,044 | B2 * | 9/2009 | Williams et al. | 347/19 |
| 8,033,634 | B2 * | 10/2011 | Komatsu et al. | 347/19 |
| 8,042,899 | B2 * | 10/2011 | Folkins et al. | 347/10 |
| 8,087,740 | B2 * | 1/2012 | Piatt et al. | 347/9 |
| 8,256,869 | B2 * | 9/2012 | Amoah-Kusi et al. | 347/19 |
| 2002/0126173 | A1 * | 9/2002 | Sarmast et al. | 347/19 |
| 2002/0177237 | A1 * | 11/2002 | Shvets et al. | 436/180 |
| 2003/0081023 | A1 * | 5/2003 | Miller et al. | 347/9 |
| 2003/0137563 | A1 * | 7/2003 | Zhang | 347/68 |
| 2003/0214562 | A1 * | 11/2003 | Zhang | 347/68 |

(Continued)

*Primary Examiner* — Sujoy Kundu
*Assistant Examiner* — Alvaro Fortich
(74) *Attorney, Agent, or Firm* — Simpson & Simpson, PLLC

(57) ABSTRACT

A computer-based apparatus, including: a memory element storing computer readable instructions; a processor; and a source element to expel a first plurality of drops of a substance with a known density through a medium, and under a set of conditions. The processor executes the computer readable instructions to calculate uncalibrated volumes for the first plurality of drops using respective images of drops in the first plurality of drops. The source element expels a second plurality of drops of the first substance through the medium, and under the first conditions. The processor executes the computer readable instructions to: calculate, using a weight for the second plurality of drops and the known density, actual volumes for the second plurality of drops; and generate, using uncalibrated volumes and the actual volumes, an equation to modify the uncalibrated volumes to match the actual volumes.

24 Claims, 7 Drawing Sheets

(56) References Cited

U.S. PATENT DOCUMENTS

| | | | | |
|---|---|---|---|---|
| 2003/0218648 | A1* | 11/2003 | Barnes et al. | 347/19 |
| 2003/0231231 | A1* | 12/2003 | Zhang | 347/68 |
| 2004/0223015 | A1* | 11/2004 | Couwenhoven et al. | 347/12 |
| 2004/0267888 | A1* | 12/2004 | Oswald | 709/206 |
| 2005/0068352 | A1* | 3/2005 | Smektala et al. | 347/9 |
| 2005/0078136 | A1* | 4/2005 | Barnes et al. | 347/19 |
| 2005/0146543 | A1* | 7/2005 | Smith et al. | 347/6 |
| 2007/0229609 | A1* | 10/2007 | Kim et al. | 347/84 |
| 2007/0257952 | A1* | 11/2007 | Keller et al. | 347/12 |
| 2008/0018710 | A1* | 1/2008 | Mantell | 347/63 |
| 2008/0266339 | A1* | 10/2008 | Snyder et al. | 347/12 |
| 2009/0322822 | A1* | 12/2009 | Kneezel et al. | 347/17 |
| 2010/0097590 | A1* | 4/2010 | Schumaker | 355/53 |
| 2010/0098859 | A1* | 4/2010 | Schumaker | 427/256 |
| 2010/0149268 | A1* | 6/2010 | Silverbrook | 347/47 |
| 2011/0090275 | A1* | 4/2011 | Govyadinov et al. | 347/14 |
| 2011/0286896 | A1* | 11/2011 | Hess et al. | 422/503 |
| 2012/0075378 | A1* | 3/2012 | Baldy et al. | 347/19 |
| 2012/0120163 | A1* | 5/2012 | Ellinger | 347/75 |

* cited by examiner

APPARATUS AND METHOD FOR MEASURING DROP VOLUME

TECHNICAL FIELD

The present disclosure relates to a quick and cost-effective means for determining drop volume using optical images of the drops. In particular, the present disclosure relates to a means for determining drop volume of ink drops ejected from a printhead for a printer.

BACKGROUND

Drop volume is an important parameter for many processes in which drops are expelled as part of an operation of a device or as part of a fabricating process. For example, for inkjet printers, drop volume is an important factor for evaluating ink jetting performance, which in turn can be impact overall performance of the printer. In particular, drop volume data can be critical for development activities such as the early stages of designing ejector, or jet, geometry, formulating new inks, and developing specific printhead drive waveforms. It is know to determine drop volume indirectly by measuring the total weight of tens of millions of drops, for example, the drops are ejected and received on a substrate with a known weight. The substrate with the received drops is then weighted on a balance and the weight of the drops is derived by subtracting the known weigh of the substrate. However, this method is extremely time-consuming and expensive. Use of this method can undesirably prolong the development cycle for new products and increase the cost of the development cycle.

Drop velocity calculation, frequency sweep, and a drop volume frequency sweep are often performed to evaluate ink ejecting performance. It is known to use stroboscopic imaging to generate optical images of expelled drops to measure drop velocity. For example, the stroboscopic imaging system produces high frequency, intensive, short pulsed flashes of light that illuminate drops in flight and produce optical images of the drops in flight. Determining drop volume requires the much slower and cumbersome weighing procedure described above. A drop volume frequency sweep using the drop volume procedure noted above (weighing tens of millions of drops) typically requires hours (and undesirably large amounts of ink) to complete. In contrast a drop velocity calculation, frequency sweep measures can typically be completed in several minutes.

Due to the length of time and the amount of ink required to complete a single drop volume frequency test, it is time consuming and costly, if not impossible, to acquire drop volume frequency sweep data in those cases, for example, selection of single jet design or waveform development, in which tens or hundreds of frequency sweeps are needed. Furthermore the weighting method described above only works for steady jetting conditions in which all drops have the same volumes. In practice, drop velocity as well as drop volume vary considerably in any drop burst pattern, which also is a key factor for assessing jetting performance. The above weighing procedure is unable to measure volume of individual drop in burst pattern because it is an average measurement. In addition, to use the above weighing procedure for a printing application, tens of milliliters of ink are typically required to conduct a single drop volume frequency sweep. However, each batch of experimental inks is typically made in similar volume, for example, hundreds of milliliters. A typical ink evaluation set includes tens of other tests beyond drop volume. Therefore, due to the small volumes of ink typically generated for experimental inks, drop volume determination at all desired conditions is often not possible.

SUMMARY

According to aspects illustrated herein, there is provided a computer-based method for measuring volume of a drop, including: storing, in a memory element of a computer, computer readable instructions; expelling a first plurality of drops of a first substance with a known density from a source element, through a medium, and under at least one condition; executing, using a processor for the computer, the computer readable instructions to calculate a plurality of uncalibrated volumes for the first plurality of drops using respective images of drops in the first plurality of drops; expelling a second plurality of drops of the first substance from the source element, through the medium, and under the at least one condition; and executing, using the processor, the computer readable instructions to: calculate, using a weight for the second plurality of drops and the known density, a plurality of actual volumes for the second plurality of drops; and generate, using the plurality of uncalibrated volumes and the plurality of actual volumes, an equation to modify the plurality of uncalibrated volumes to match the plurality of actual volumes.

According to aspects illustrated herein, there is provided a computer-based method for measuring volume of a drop from a printhead for a printer, including: storing, in a memory element of a computer, computer readable instructions; and expelling first respective pluralities of drops of a first ink with a known density from the print head by: applying first respective drive voltages to the printhead while expelling the first respective pluralities of drops at a first constant frequency; or applying a first constant drive voltage and expelling the first respective pluralities of drops at first respective frequencies. The method includes: executing, using a processor for the computer, the computer readable instructions to calculate respective uncalibrated volumes for the first respective pluralities of drops using respective images of drops in the first respective pluralities of drops; and expelling second respective pluralities of drops of the first ink by: applying the first respective drive voltages to the printhead while expelling the second respective pluralities of drops at the first constant frequency; or applying the first constant drive voltage and expelling the second respective pluralities of drops at the first respective frequencies. The method includes executing, using the processor, the computer readable instructions to: calculate, using respective weights for the second respective pluralities of drops and the known density, respective actual volumes for the second respective pluralities of drops; and generate, using the respective uncalibrated volumes and the respective actual volumes, an equation to modify the respective uncalibrated volumes to match the respective actual volumes. The drive voltage regulates a size of a drop expelled from the printhead.

According to aspects illustrated herein, there is provided a computer-based apparatus for measuring volume of a drop, including: a memory element for a computer arranged to store computer readable instructions; a processor for the computer; and a source element arranged to expel a first plurality of drops of a first substance with a known density through a medium, and under a first set of conditions. The processor is arranged to execute the computer readable instructions to calculate a plurality of uncalibrated volumes for the first plurality of drops using respective images of drops in the first plurality of drops. The source element is arranged to expel a second plurality of drops of the first substance through the medium, and under the first conditions. The processor is arranged to execute the computer readable instructions to: calculate, using a weight for the second plurality of drops and the known density, a plurality of actual volumes for the second plurality of drops; and generate, using the plurality of uncalibrated volumes and the plurality of actual volumes, an equation to modify the plurality of uncalibrated volumes to match the plurality of actual volumes.

According to aspects illustrated herein, there is provided a computer-based apparatus for measuring volume of a drop from a printhead for a printer, including: a memory element for a computer arranged to store computer readable instructions; a processor for the computer; and the printhead arranged to expel first respective pluralities of drops of a first ink with a known density by: applying first respective drive voltages to the printhead while expelling the first respective pluralities of drops at a first constant frequency; or applying a first constant drive voltage and expelling the first respective pluralities of drops at first respective frequencies. The processor is arranged to execute the computer readable instructions to calculate respective uncalibrated volumes for the first respective pluralities of drops using respective images of drops in the first respective pluralities of drops. The printhead is arranged to expel second respective pluralities of drops of the first ink by: applying the first respective drive voltages to the printhead while expelling the second respective pluralities of drops at the first constant frequency; or applying the first constant drive voltage and expelling the second respective pluralities of drops at the first respective frequencies. The processor is arranged to execute the computer readable instructions to: calculate, using respective weights for the second respective pluralities of drops and the known density, respective actual volumes for the second respective pluralities of drops; and generate, using the respective uncalibrated volumes and the respective actual volumes, an equation to modify the respective uncalibrated volumes to match the respective actual volumes, wherein the drive voltage regulates a size of a drop expelled from the printhead.

BRIEF DESCRIPTION OF THE DRAWINGS

Various embodiments are disclosed, by way of example only, with reference to the accompanying schematic drawings in which corresponding reference symbols indicate corresponding parts, in which.

DETAILED DESCRIPTION

As used herein, the words "printer," "printer system", "printing system", "printer device" and "printing device" as used herein encompasses any apparatus, such as a digital copier, bookmaking machine, facsimile machine, multi-function machine, etc. which performs a print outputting function for any purpose.

Moreover, although any methods, devices or materials similar or equivalent to those described herein can be used in the practice or testing of these embodiments, some embodiments of methods, devices, and materials are now described.

Figure 1:
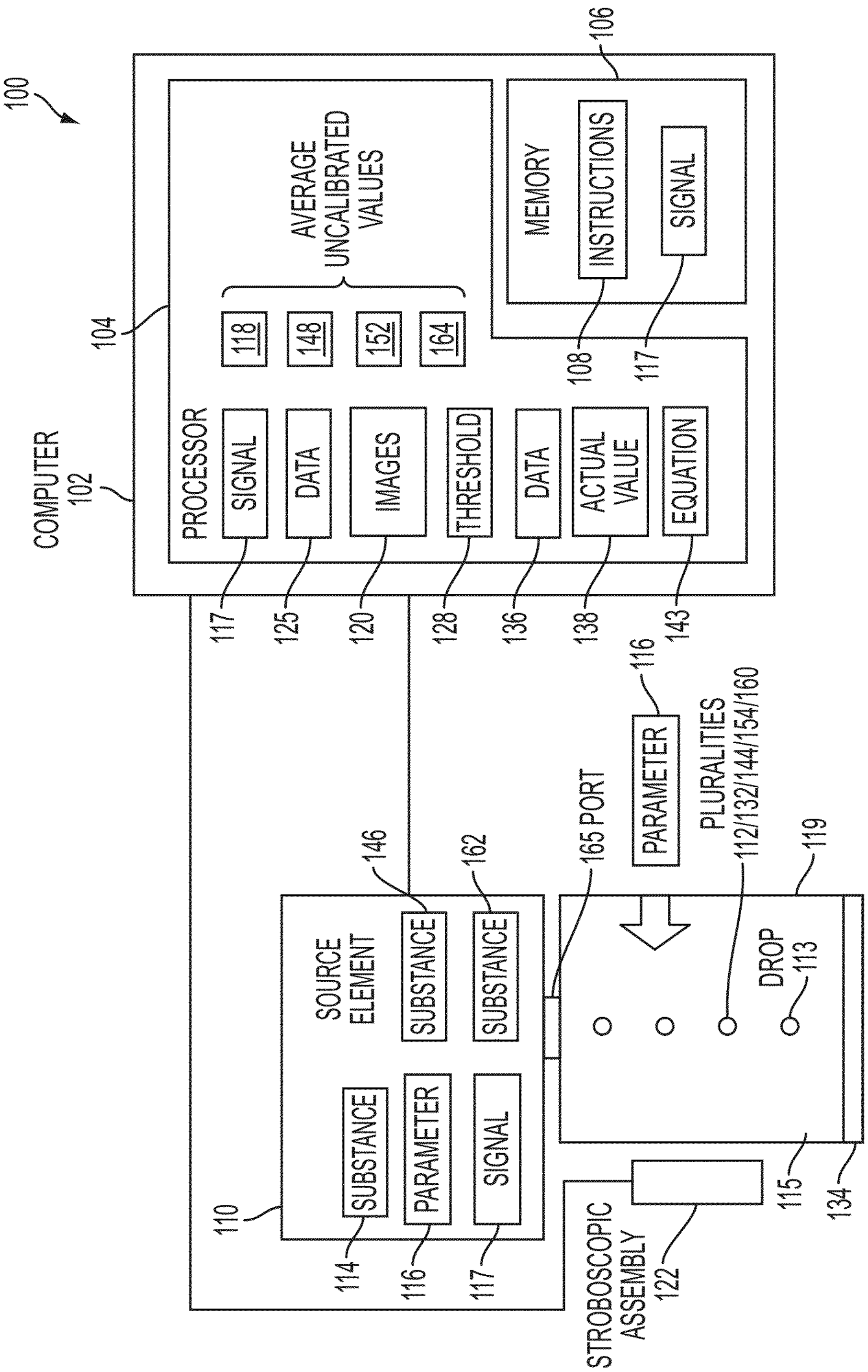
FIG. 1 is a schematic block diagram of an apparatus for measuring drop volume.

FIG. 1 is a schematic block diagram of apparatus 100 for measuring drop volume. Apparatus 100 includes computer 102 with processor 104 and memory element 106 arranged to store computer readable instructions 108. Apparatus 100 also includes source element 110 arranged to expel a plurality 112 of drops 113 of substance 114 with a known density through medium 115. In an example embodiment, plurality 112 includes respective pluralities 112 of drops as further described below. The respective pluralities of drops are not limited to any particular respective number of drops. Further, respective pluralities of drops can include the same or different respective numbers of drops.

The source element is arranged to expel plurality 112 under a set of conditions. In an example embodiment, the set of conditions includes expelling plurality 112 while at least one parameter 116 affecting the expulsion of the drops or the behavior of the drops while the drops are passing through the medium is varied. For example, a particular plurality 112 is associated with a particular quantification of the parameter, as further described below. The at least one parameter can be any parameter known in the art as further described below.

In an example embodiment, operation of the source element is controlled by the processor, for example, by executing instructions 108. That is, a particular plurality of drops, such as plurality 112, is expelled in response to one or more control signals 117 inputted to the source element. For example, a magnitude of the signals, a frequency of the signals, or data included in the signals affects how drops are expelled from the source element. In an example embodiment, signals 117 are stored in the memory element or inputted to the processor and transmitted to the source element by the processor. The discussion regarding operation of the source element by the processor is applicable to other pluralities of drops described infra.

As an example, in the control signal case, the control signal is a voltage signal and the voltage level of the control signal determines the size of the drops expelled. One plurality 112 is expelled in response to a level of 30 volt for the signal, another plurality 112 is expelled in response to a level of 40 volt for the signal, and further pluralities 112 are expelled in response to progressively larger voltage levels for the signal.

In an example embodiment, while pluralities 112 are passing through the medium, each plurality is exposed to a particular physical condition associated with a particular quantification of the parameter. By "passing through the medium" we mean that the drops have been expelled by the source element and travel of the drops has not yet been terminated, for example, the drops have not yet impacted a surface or device. For example, if the source element is being used in a pharmaceutical operation, drops of a pharmaceutical substance are ejected by the source element and pass through the medium until the drops contact receiving element 134. While passing through the medium, the drops may be affected by gravity or other forces related to the parameter as further described infra. The medium can be any medium known in the art through which drops can be transmitted, for example, other combinations of gases, or another liquid. In general, a medium through which the drops pass has one or more predetermined properties.

As an example, in the case in which the drops are passing through the medium, the medium is a combination of gases contained in environmental chamber 119 and forces associated the parameter act on the gases in the chamber or are present in the chamber. Possible parameters include, but are not limited to a magnetic field, an electrical field, an electrostatic field, temperature, chemical composition, or pressure. Temperature is used as the parameter in the following example, although it should be understood that other parameters could be used. In the example that follows it is assumed that inputs to the source element remain constant. One plurality 112 is expelled into the medium when the chamber is heated to a first temperature, another plurality 112 is expelled into the medium when the chamber is heated to a second, higher, temperature, and further pluralities 112 are expelled into the medium when the chamber is heated to progressively higher temperatures. In an example embodiment, one or more inputs to the source element are varied in addition to varying the parameter affecting the chamber. In an example embodiment, while respective pluralities 112 are passing through the medium, each respective plurality 112 is exposed to one physical condition associated with one quantification of a parameter and is exposed to another respective physical condition associated with a quantification of a another parameter; or, in response to one control signal 117 and in response to respective control signals 117 associated with a respective quantification of parameter.

The processor is arranged to execute the computer readable instructions to calculate an average uncalibrated volume 118 for each plurality 112 expelled from the source element using respective images 120 of drops in pluralities 112, as is known in the art. Any means known in the art can be used to generate the optical images. In an example embodiment, the processed images are generated from respective stroboscopic images, or a high-speed camera. In an example embodiment, the processed images are generated outside of apparatus 100 are inputted to apparatus 100. In an example embodiment, stroboscopic images are inputted to apparatus 100 and the processor generates the processed images. In an example embodiment, apparatus 100 includes stroboscopic assembly 122 used to generate stroboscopic images of the drops as the drops pass through or by the stroboscopic assembly and the processor generates the processed images from input received from assembly 122 regarding the stroboscopic images. The processor controls operation of assembly 122, for example, by executing instructions 108 and sending appropriate control signals to assembly 122.

Figure 2:
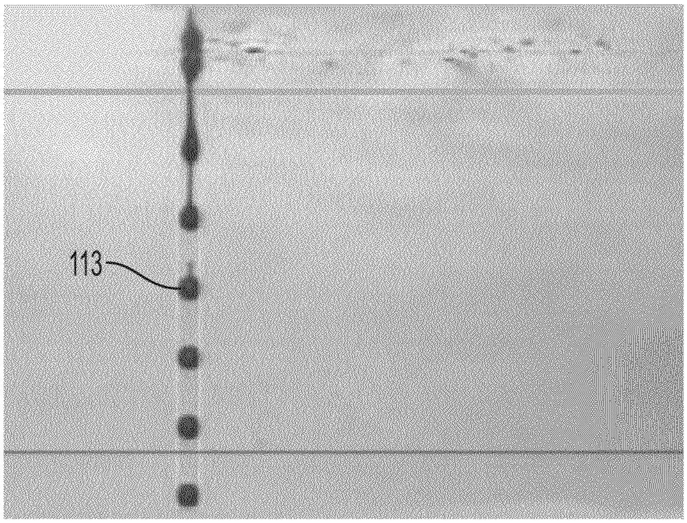
FIG. 2 is a pictorial representation of a stroboscopic image of an expelled drop.

FIG. 2 is a pictorial representation of a stroboscopic image of expelled drops. The following is an example procedure for calculating average uncalibrated volume 118. Due to the variation of image background caused by different lighting conditions and conditions associated with the source element, for example, when the source element is a printhead for a printer, the conditions include front surface conditions around different ejectors across the whole printhead; a simple constant threshold for the images is not suitable. Instead a dynamic threshold value based on individual image conditions is used as described below. In an example embodiment, data 125 regarding images generated by assembly 122 is transmitted to the computer.

Figure 3:
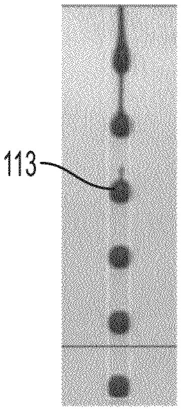
FIG. 3 is a pictorial representation of a cropped version of the stroboscopic image of FIG. 2.

FIG. 3 is a pictorial representation of a cropped version of the stroboscopic image of FIG. 2. By comparing images at the same location before and after expelling drops, the difference between two images shows the appearance of drops in flight. The total area occupied by drops in the two dimensional image of FIG. 2 is estimated, and the image is cropped around the drops such that the foreground (drop area) includes a greater proportion of the cropped image as shown in FIG. 3. Thus, to generate the image in FIG. 3, an initial stroboscopic image is cropped to reduce the amount of background area, thus increasing the area ratio of the drops to the background. The cropping step removes background nonuniformity and also makes the foreground more distinguishable from the background. In an example embodiment, the processor performs the cropping.

Figure 4:
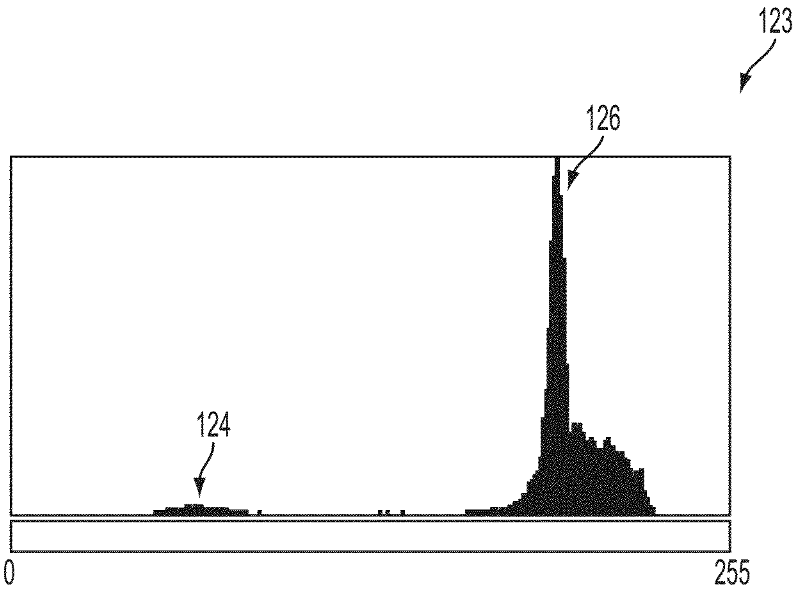
FIG. 4 is a pixel value histogram derived from images such as those shown in FIG. 3.

FIG. 4 shows pixel value histogram 123 derived from the image shown in FIG. 3. The cropped image is converted to an eight bit grey image and a pixel value histogram of the cropped image is calculated as shown in FIG. 4 using any means known in the art. As shown in FIG. 4, peak 124 at a relatively smaller pixel value (darker) represents the drops (foreground), and peak 126 at a relatively larger pixel value (lighter) represents the background. Further optimization of the cropping procedure described above can enhance the distinction between the foreground and background in the histogram. In an example embodiment, the processor generates the histogram. In an example embodiment, the processor displays the histogram.

Figure 5:
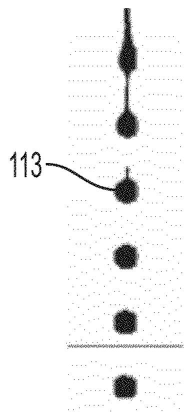
FIG. 5 is a pictorial representation of a thresholded image derived from the histogram shown in FIG. 4.

FIG. 5 is a pictorial representation of a thresholded image derived from the histogram shown in FIG. 4. Using the two peaks, threshold value 128 is determined for use in creating the binary image of FIG. 5. For example, any pixel in the image of FIG. 3 with a pixel value less than or equal to the threshold is "black" in the binary image, for example, assigned a pixel value of 0, and any pixel in the image of FIG. 2 with a pixel value greater than the threshold is "white" in the binary image, for example, assigned a pixel value of 255. As noted above, the threshold is dynamic and can be selected to optimize the binary image. In FIG. 4, the threshold is about midway between peaks 124 and 126; however, it should be understood that other relative positions or values for the threshold are possible. In an example embodiment, the processor generates the threshold value.

Figure 6:
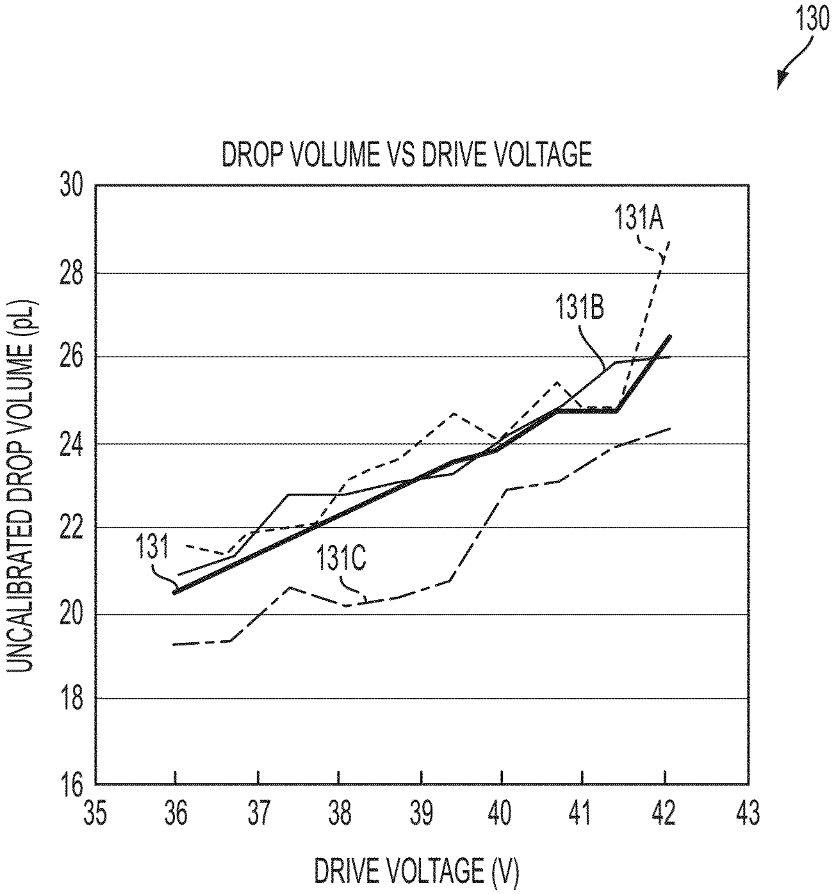
FIG. 6 shows a graph of average uncalibrated volumes calculated using images versus at least one parameter affecting the expulsion of the drops or the behavior of the drops once the drops are expelled.

FIG. 6 shows graph 130 of average uncalibrated volumes 118 calculated using images 120 versus at least one parameter 116 affecting the expulsion of the drops or the behavior of the drops once the drops are expelled. The processor fits respective circles or ellipses to images of the drops. The processor calculates average uncalibrated volumes 118 from the respective circles or ellipses using any means known in the art. Line 131 represents volumes 118. Alternatively, the areas of images of drops are used to calculate the drop volume As noted supra, the accuracy of the known methods of estimating drop volume from optical images is unsuitable for some applications. To improve upon the accuracy of graph 130, the following calibration procedure is implemented. The source element expels respective pluralities 132 of drops of substance 114 under the same conditions under which the first respective pluralities of drops 112 (those used to generate average uncalibrated volumes 118) were expelled. The number of drops included in each plurality 132 is known. Respective drops for pluralities 132 are collected on receiving element 134 and weighed using any means known in the art. In an example embodiment, data 136 including a known weight of receiving element 134 and the weight of receiving element 134 after receiving pluralities 132 is received by the processor. The processor calculates the weight of the drops for each plurality of drops using the weight of receiving element 134 before and after receiving the drops. It should be understood that the preceding weighing sequence can be performed for each plurality 132 or for some combination of all of pluralities 132. In an example embodiment, apparatus 100 includes receiving element 134.

The processor calculates an average actual volume 138 for each plurality 132 using the weight of the drops, the known density of substance 114, and the number of drops in each plurality 132. Although a particular procedure is described for obtaining volumes 138, it should be understood that any other procedure known in the art involving the weighing of drops 112 can be used. In general, a relatively large number of drops expelled over a relatively large stretch of time are needed to implement the weighing procedure described above.

Figure 7:
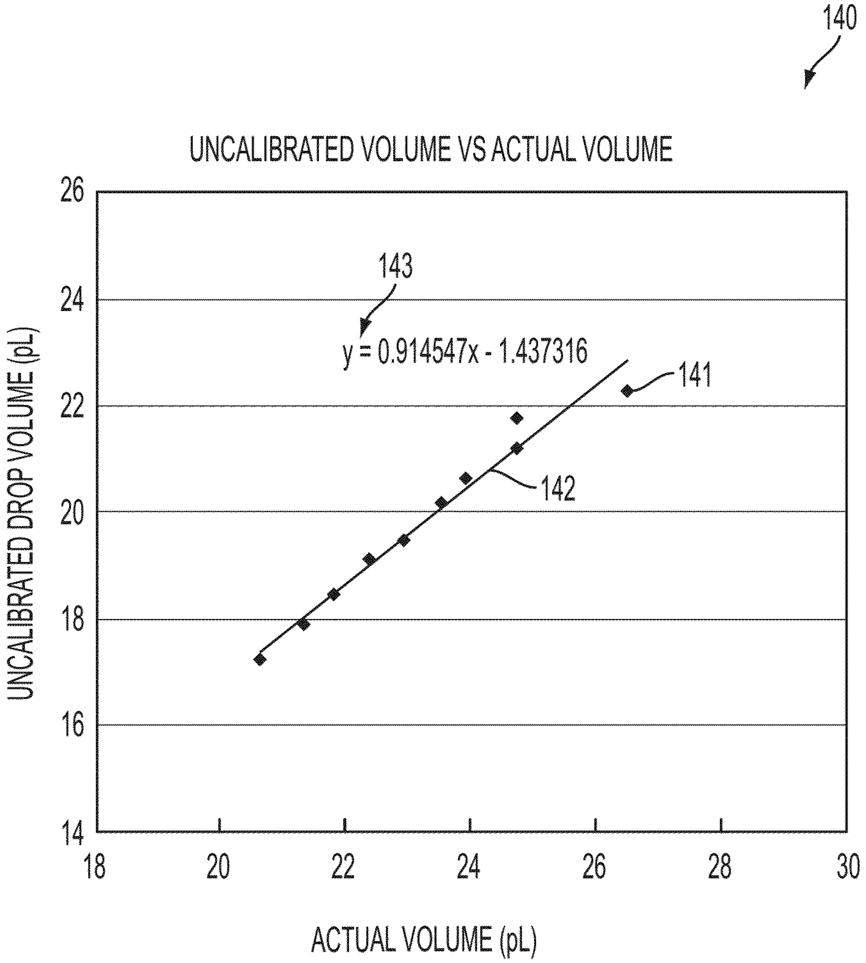
FIG. 7 shows a graph of average uncalibrated volumes versus average actual volumes.

FIG. 7 shows graph 140 of average uncalibrated volumes 118 versus average actual volumes 138. The processor is arranged to execute the computer readable instructions to display graph 140. Points 141 represent pairs of uncalibrated volumes 118 and actual volumes 138 Line 142 represents a linear fit of all points 141. The processor also executes the computer readable instructions to generate, using volumes 118 and 138, calibration equation 143 that is used to adjust the average uncalibrated volumes to match the average actual volumes. An example of an equation 143 generated from linear fitting line 142 is shown in the graph. It should be understood that the equation shown is specific to the data shown in the figures and that a particular equation 143 is dependent on the particular data associated with a particular operation of apparatus 100. Other fitting curves such as polynomial can be used to generate equation 143 if points 141 appear to be non-linear. Any means known in the art can be used to generate equation 143.

As further described below, equation 143 is used to adjust, or calibrate, uncalibrated volumes, for example, similar to volumes 118, for subsequent pluralities of drops of substance 114 or for pluralities of drops of another substance, as further described below. Further, equation 143 also is applicable to pluralities of drops in which parameter 116 is varied.

As an example, the source element expels pluralities 144 of substance 146 having at least some characteristics different from those of substance 114. Pluralities 144 are expelled under the same respective conditions under which the first respective pluralities of drops 112 (those used to generate average uncalibrated volumes 118) were expelled. Average uncalibrated volumes 148 for pluralities 144 are calculated using the same process described above to calculate volumes 118 using optical images of the drops. The processor uses equation 143 to calibrate, or adjust, each volume 148, correcting respective errors in volumes 148 associated with the calculation of volume 148 using optical data.

Figure 8:
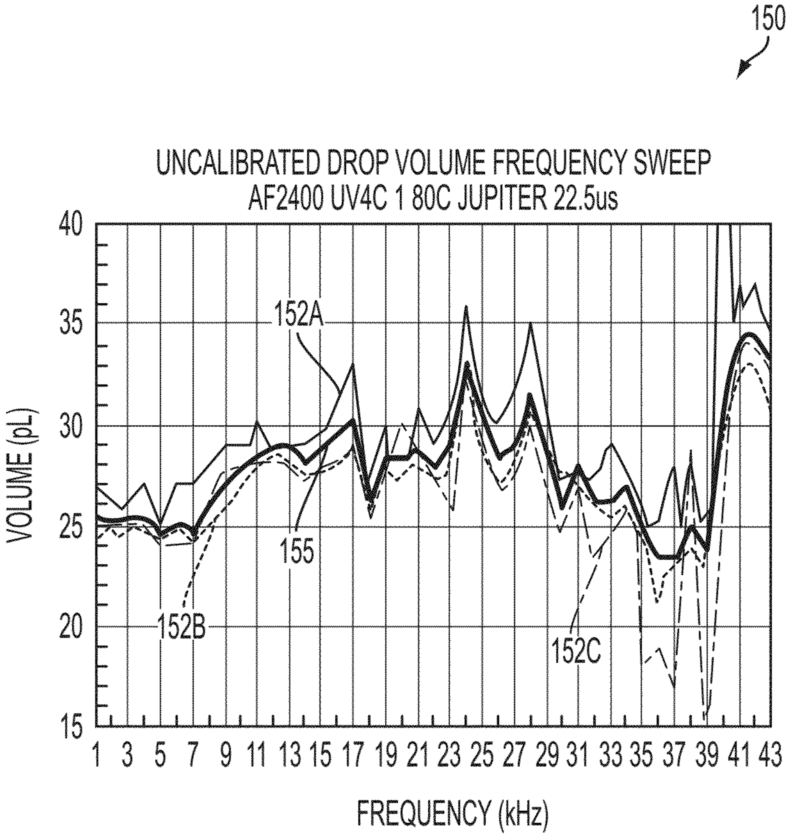
FIG. 8 shows a graph of average uncalibrated volumes versus at least one different parameter affecting the expulsion of the drops or the behavior of the drops once the drops are expelled; and, FIG. 9 shows a graph in which uncalibrated volumes shown in FIG. 8 have been adjusted, or calibrated, using the calibration equation.

FIG. 8 shows graph 150 of average uncalibrated volumes 152 versus at least one different parameter affecting the expulsion of the drops or the behavior of the drops once the drops are expelled. As an example, pluralities 154 of substance 114 can be expelled under conditions different from those under which pluralities 112 were expelled to generate volumes 118. For example, a magnitude of signal 117 controls the size of drops in pluralities 112 expelled from the source element and a frequency of signal 117, or data in signal 117, controls the frequency at which the drops are expelled. As an example, to generate FIG. 6, the frequency of signal 117 is held constant and the magnitude of signal 117 is progressively increased for each successive plurality of drops 112 expelled from the source element. To generate FIG. 8, for example, the magnitude of signal 117 is held constant and the frequency of signal 117 is progressively increased for each successive plurality of drops 112 expelled from the source element. Average uncalibrated volumes 152 are calculated using the same process described above to calculate volumes 118 using optical images of the drops. Line 155 represents an average of volumes 152.

Figure 9:
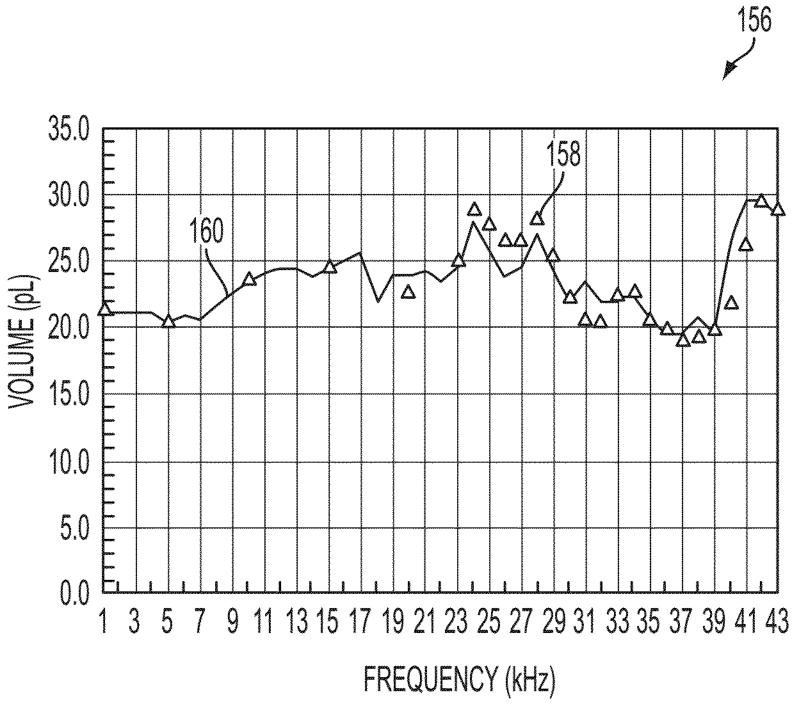

FIG. 9 shows graph 156 in which uncalibrated volumes 152 shown in FIG. 8 have been adjusted, or calibrated, using calibration equation 143. The processor applies equation 143 to volumes 152 to adjust, or calibrate, volumes 152 to generate graph 156. Points 158 represent values for volumes 152 acquired from weighing procedure and line 160 represents the adjusted, or calibrated, values for volumes 152 per equation 143. Calibrated line 160 and points 158 show good matching of their values.

In a manner similar to that described for pluralities 154, pluralities 160 of substance 162 having at least some characteristics different from those for substance 114 can be expelled under conditions different from those under which pluralities 112 were expelled to generate volumes 118. For example, a magnitude of signal 117 controls the size of drops expelled from the source element and a frequency of signal 117 controls the frequency at which drops are expelled. As an example, the magnitude of signal 117 is held constant and the frequency of signal 117 is progressively increased for each successive plurality 160 expelled from the source element. Average uncalibrated volumes 164 are calculated using the same process described above to calculate volumes 118 using optical images of the drops. The processor applies equation 143 to volumes 164 to adjust, or calibrate, volumes 164.

It should be understood that for each plurality of drops from a set of pluralities of drops, for example, pluralities 112, the drops can be expelled from a single port 165 in the source element, or the drops can be expelled from a plurality of ports. Further, it is not necessary for each plurality of drops in the set to be expelled by the same ports or by the same number of ports.

In an example embodiment, assembly 100 includes at least portions of a printer, the source element is a printhead for the printer, and the substances expelled from the printhead are various types of ink. The printhead can include any number of injectors for ejecting, or expelling, the ink. In the discussion that follows, the printhead has at least 100 ejectors; however, it should be understood that the printhead can have other numbers of ejectors. The discussion regarding FIGS. 2 through 5 is applicable to the printhead/printer embodiment.

Returning to FIG. 6, to generate FIG. 6 (and the images described with respect to FIGS. 2 through 5); substance 114 is an ink ejected from 23 of the ejectors on the printhead. In an example embodiment, the ejectors are evenly spaced across the printhead; however, it should be understood that other numbers of ejectors and configurations and spacings of ejectors are possible. The frequency at which the ink drops are ejected is held constant. In this example, the frequency is held at 1 kHz; however, it should be understood that other frequencies are possible. In some instances, maintaining a relatively low ejecting frequency can reduce "satellite" anomalies in the optical images due, for example, to smaller droplets or distortion of the drops, for example, resulting in only a single spherical drop appearing in an image. The drive voltage, which generally controls the size of ink drops ejected from the printhead, is the parameter shown for the X axis and varies from 36 to 42 volts. To maintain the clarity of FIG. 6, the individual average uncalibrated volumes for only three of the 23 ejectors, lines 131A-C, are shown as an example. It should be understood that line 131 represents an average of the respective uncalibrated volumes for all of the ejectors. It should be understood that considerable variation of average uncalibrated volumes for the 23 ejectors for each drive voltage value is possible.

Returning to FIG. 7, graph 140 shows uncalibrated versus actual (derived from weighting the drops) volumes for the ink drops represented in FIG. 6.

Returning to FIG. 8, the same ink used to generate FIGS. 6 and 7 is used. However, for FIG. 8, the drive voltage is maintained at a constant value and the frequency, shown for the X axis varies from 1 kHz to 43 kHz. Again, to maintain the clarity of FIG. 8, the individual average uncalibrated volumes for only three of the 23 ejectors, lines 152A-C, are shown as an example. It should be understood that line 152 represents an average of the respective uncalibrated volumes for all of the ejectors. It should be understood that considerable variation of average uncalibrated volumes for the 23 ejectors for each frequency value is possible.

Returning to FIG. 9, equation 143 has been used to calibrate the uncalibrated average volumes of FIG. 8.

Apparatus 100 enables fast and accurate determination of drop volume using readily available optical images of the drops. For example, such optical images are routinely generated for printing applications to measure other parameters such as velocity of drops ejected from a printhead. Advantageously, only a single calibrating operation, for example, the generation and weighing of pluralities 132, is needed to generate the calibration equation which is then applicable to other drop generating operations.

Apparatus 100 can be used for any operation in which is necessary or desirable to quickly, cost-effectively, and accurately ascertain volumes for drops being expelled as part of the operation. Possible applications include, but are not limited to, operations, as well as printing applications, pharmaceutical operations, application of adhesives, titration operations, medical applications, biological applications, general chemical operations, 3D printing applications, printed electronics applications, patterning and coating applications, and general mixing.

It will be appreciated that various of the above-disclosed and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims.

What is claimed is:

1. A computer-based method for measuring volume of a drop, comprising:

storing, in a memory element of a computer, computer readable instructions;

expelling a first plurality of drops of a first substance from a source element, through a medium, and under at least one condition, wherein a density of the first substance is known;

executing, using a processor for the computer, the computer readable instructions to:

generate respective images of drops in the first plurality of drops as the drops are passing through the medium;

calculate an uncalibrated volume for the first plurality of drops using the respective images of the drops in the first plurality of drops;

expelling a second plurality of drops of the first substance from the source element, through the medium, and under the at least one condition; and, executing, using the processor, the computer readable instructions to:

calculate, using a weight for the second plurality of drops and the known density, an actual volume for the second plurality of drops; and, generate, using the uncalibrated volume and the actual volume, an equation to modify the uncalibrated volume to match the actual volume, wherein:

expelling the first plurality of drops under at least one condition includes exposing the first plurality of drops to a first physical condition affecting the medium:

after the first plurality of drops has been expelled from the source element;

while the first plurality of drops is passing through the medium; and, before travel of the first plurality of drops through the medium has terminated;

expelling the second plurality of drops under the at least one condition includes exposing the first plurality of drops to the first physical condition affecting the medium:

after the second plurality of drops has been expelled from the source element;

while the second plurality of drops is passing through the medium; and, before travel of the second plurality of drops through the medium has terminated.

2. The computer-based method of claim 1, wherein expelling the first respective and second pluralities of drops further comprises expelling the first respective and second pluralities of drops in response to the processor executing the computer readable instructions, the method further comprising executing, using the processor, the computer readable instructions to:

generate respective pluralities of photographs of the first respective plurality of drops using a stroboscopic assembly or a high speed camera system; and, generate, using the respective pluralities of photographs, the respective images of drops in the first respective pluralities of drops.

3. The computer-based method of claim 1, wherein expelling first respective pluralities of drops includes executing, using the processor, the computer readable instructions to input a second control signal to the source to control expulsion of the first respective pluralities of drops.

4. The computer-based method of claim 1 further comprising:

expelling a third plurality of drops of a second substance;

exposing the third plurality of drops to the first physical condition affecting the medium:

after the third plurality of drops has been expelled from the source element;

while the third plurality of drops is passing through the medium; and, before travel of the first plurality of drops through the medium has terminated; and, executing, using the processor, the computer readable instructions to:

calculate respective uncalibrated volumes for the third respective pluralities of drops using respective images of drops in the third respective pluralities of drops; and, modify, using the equation, the respective uncalibrated volumes.

5. The computer-based method of claim 1 further comprising:

expelling a third plurality of drops of the first substance;

exposing the third plurality of drops to the first physical condition and a second physical condition affecting the medium:

after the third plurality of drops has been expelled from the source element;

while the third plurality of drops is passing through the medium; and, before travel of the first plurality of drops through the medium has terminated; and, executing, using the processor, the computer readable instructions to:

calculate respective uncalibrated volumes for the third respective pluralities of drops using respective images of drops in the third respective pluralities of drops; and, modify, using the equation, the respective uncalibrated volumes.

6. The computer-based method of claim 1, wherein exposing the first plurality of drops to the first physical condition includes exposing the first plurality of drips to a magnetic field, an electric field or an electrostatic field while the first plurality of drops is passing through the medium.

7. A computer-based method for measuring volume of a drop from a printhead for a printer, comprising:

storing, in a memory element of a computer, computer readable instructions;

expelling, in succession, first respective pluralities of drops of a first ink from the print head, wherein a density of the first ink is known, by:

applying a first constant drive voltage to the printhead; and, expelling the first respective pluralities of drops at progressively increasing first frequencies such that for each first respective plurality of drops, the first respective frequency is greater than the first respective frequency for a first respective plurality of drops immediately preceding said each first respective plurality of drops in the succession;

executing, using a processor for the computer, the computer readable instructions to:

generate respective images of drops in the first respective pluralities of drops as the drops are passing through the medium;

calculate respective uncalibrated volumes for the drops in the first respective pluralities of drops using the respective images of the drops in the first respective pluralities of drops;

expel, in succession, second respective pluralities of drops of the first ink by:

applying the progressively increasing first respective frequencies to the printhead such that for each second respective plurality of drops, the first respective frequency is greater than the first respective frequency for a second respective plurality of drops immediately preceding said each second respective plurality of drops in the succession; and, expelling the second respective pluralities of drops at the first constant drive voltage; and, executing, using the processor, the computer readable instructions to:

calculate, using respective weights for the second respective pluralities of drops and the known density, respective actual volumes for the second respective pluralities of drops; and, generate, using the respective uncalibrated volumes and the respective actual volumes, an equation to modify the respective uncalibrated volumes to match the respective actual volumes, wherein the drive voltage regulates a size of a drop expelled from the printhead.

8. The computer-based method of claim 7, wherein:

expelling the first and second respective pluralities of drops further comprises expelling the first and second respective pluralities of drops in response to the processor executing the computer readable instructions;

generating respective images of drops in the first respective pluralities of drops as the drops are passing through the medium includes generating respective pluralities of photographs of the first respective plurality of drops using a stroboscopic assembly or a high speed camera system; and, calculating respective uncalibrated volumes for the drops in the first respective pluralities of drops using the respective images of the drops in the first respective pluralities of drops includes generating, using the respective pluralities of photographs, the respective images of drops in the first respective pluralities of drops.

9. The computer-based method of claim 7 further comprising:

expelling third respective pluralities of drops of a second ink from the print head by applying the first constant drive voltage and expelling the third respective pluralities of drops at the first respective frequencies; and, executing, using the processor, the computer readable instructions to:

calculate respective uncalibrated volumes for the third respective pluralities of drops using respective images of drops in the third respective pluralities of drops; and, modify, using the equation, the respective uncalibrated volumes.

10. A computer-based apparatus for measuring volume of a drop, comprising:

a memory element for a computer arranged to store computer readable instructions;

a processor for the computer; and, a source element, arranged to expel a first plurality of drops of a first substance through a medium, and under a first set of conditions, wherein:

a density of the first substance is known;

the processor is arranged to execute the computer readable instructions to:

generate respective images of drops in the first plurality of drops as the drops are passing through the medium;

calculate a plurality of uncalibrated volumes for the first plurality of drops using the respective images of the drops in the first plurality of drops;

the source element is arranged to expel a second plurality of drops of the first substance through the medium, and under the first conditions;

the processor is arranged to execute the computer readable instructions to:

calculate, using a weight for the second plurality of drops and the known density, a plurality of actual volumes for the second plurality of drops; and, generate, using the plurality of uncalibrated volumes and the plurality of actual volumes, an equation to modify the plurality of uncalibrated volumes to match the plurality of actual volumes;

expelling the first plurality of drops includes varying at least one parameter affecting the behavior of the first plurality of drops while the first plurality of drops is passing through the medium; and, varying the at least one parameter affecting the behavior of the first plurality of drops while the first plurality of drops is passing through the medium includes varying a temperature, a chemical composition, or a pressure in the medium while the first plurality of drops is passing through the medium.

11. The computer-based apparatus of claim 10 further comprising a stroboscopic assembly or a high speed camera system, wherein the processor is arranged to execute the computer readable instructions to:

expel the first and second respective pluralities of drops;

generate respective pluralities of photographs of the first respective plurality of drops using the stroboscopic assembly or a high speed camera system; and, generate, using the respective pluralities of photographs, the respective images of drops in the first respective pluralities of drops.

12. The computer-based apparatus of claim 10 wherein expelling first respective pluralities of drops includes executing, using the processor, the computer readable instructions to input a second control signal to the source to control expulsion of the first respective pluralities of drops.

13. The computer-based apparatus of claim 10, wherein:

the source element is arranged to expel third respective pluralities of drops of a second substance through the medium:

such that while the third respective pluralities of drops are passing through the medium, each third respective plurality of drops is exposed to a first respective physical condition associated with a respective quantification of a first parameter; and, the processor is arranged to execute the computer readable instructions to:

calculate respective uncalibrated volumes for the third respective pluralities of drops using respective images of drops in the third respective pluralities of drops; and, modify, using the equation, the respective uncalibrated volumes.

14. The computer-based apparatus of claim 10, wherein:

the source element is arranged to expel third respective pluralities of drops of the first substance through the medium;

the processor is arranged to execute the computer readable instructions to:

vary a first parameter affecting the behavior of the third plurality of drops while the third plurality of drops is passing through the medium;

vary a second parameter affecting the behavior of the third plurality of drops while the third plurality of drops is passing through the medium;

calculate respective uncalibrated volumes for the third respective pluralities of drops using respective images of drops in the third respective pluralities of drops; and, modify, using the equation, the respective uncalibrated volumes.

15. The computer-based apparatus of claim 10, wherein the at least one parameter affecting the behavior of the first plurality of drops while the first plurality of drops is passing through the medium is selected from the group consisting of a magnetic field, an electrical field, and an electrostatic field.

16. A computer-based apparatus for measuring volume of a drop from a printhead for a printer, comprising:

a memory element for a computer arranged to store computer readable instructions;

a processor for the computer; and, the printhead, arranged to expel, in succession, first respective pluralities of drops of a first ink with a known density by: applying a first constant drive voltage to the printhead; and, expelling the first respective pluralities of drops from the printhead at progressively increasing first respective frequencies such that for each first respective plurality of drops, the first respective frequency is greater than the first respective frequency for a first respective plurality of drops immediately preceding said each first respective plurality of drops in the succession, wherein:

the processor is arranged to execute the computer readable instructions to:

generate respective images of drops in the first respective pluralities of drops as the drops are passing through the medium; and, calculate respective uncalibrated volumes for the drops in the first respective pluralities of drops using the respective images of the drops in the first respective pluralities of drops;

the printhead is arranged to expel, in succession, second respective pluralities of drops of the first ink by:

applying the first constant drive voltage to the printhead; and, expelling the second respective pluralities of drops from the printhead at the progressively increasing first respective frequencies such that for each second respective plurality of drops, the first respective frequency is greater than the first respective frequency for a second respective plurality of drops immediately preceding said each second respective plurality of drops in the succession; and, the processor is arranged to execute the computer readable instructions to:

calculate, using respective weights for the second respective pluralities of drops and the known density, respective actual volumes for the second respective pluralities of drops; and, generate, using the respective uncalibrated volumes and the respective actual volumes, an equation to modify the respective uncalibrated volumes to match the respective actual volumes, wherein the drive voltage regulates a size of a drop expelled from the printhead.

17. The computer-based apparatus of claim 16, wherein the processor is arranged to execute the computer readable instructions to:

expel the first and second respective pluralities of drops;

generate respective pluralities of photographs of the first respective plurality of drops using a stroboscopic assembly or a high speed camera system; and, generate, using the respective pluralities of photographs, the respective images of drops in the first respective pluralities of drops.

18. The computer-based apparatus of claim 16, wherein:

the printhead is arranged to expel third respective pluralities of drops of a second ink by applying the first constant drive voltage and expelling the first respective pluralities of drops at the first respective frequencies; and, the processor is arranged to execute the computer readable instructions to:

calculate respective uncalibrated volumes for the third respective pluralities of drops using respective images of drops in the third respective pluralities of drops; and, modify, using the equation, the respective uncalibrated volumes.

19. The computer-based apparatus of claim 16, wherein: the printhead is arranged to:

apply the first constant drive voltage to the printhead; and, expelling third respective pluralities of drops from the printhead at the progressively increasing first respective frequencies such that for each third respective plurality of drops, the first respective frequency is greater than the first respective frequency for a third respective plurality of drops immediately preceding said each second respective plurality of drops in the succession; and, the processor is arranged to execute the computer readable instructions to:

calculate respective uncalibrated volumes for the third respective pluralities of drops using respective images of drops in the third respective pluralities of drops; and, modify, using the equation, the respective uncalibrated volumes.

20. The computer-based apparatus of claim 1, wherein the first physical condition includes: a temperature acting on the medium; a chemical composition of the medium; or, a pressure acting on the medium.

21. The computer-based method of claim 1, wherein exposing the second plurality of drops to the first physical condition includes applying a magnetic field, an electric field, or an electrostatic field to the medium while the second plurality of drops is passing through the medium.

22. The computer-based method of claim 1, wherein:

expelling the first plurality of drops under the at least one condition includes exposing the first plurality of drops to a first property of the first physical condition; and, expelling the second plurality of drops under the at least one condition includes exposing the second plurality of drops to a second property of the first physical condition.

23. The computer-based method of claim 1, wherein:

expelling the first plurality of drops under the at least one condition includes exposing the first plurality of drops to a first temperature while the first plurality of drops is passing through the medium; and, expelling the second plurality of drops under the at least one condition includes exposing the second plurality of drops to a second temperature, different from the first temperature, while the second plurality of drops is passing through the medium.

24. The computer-based apparatus of claim 10, wherein varying the at least one parameter affecting the behavior of the first plurality of drops while the first plurality of drops is passing through the medium includes varying a magnetic field in the medium, an electric field in the medium, or an electrostatic field in the medium.

* * * * *